(12) United States Patent
Mistry et al.

(10) Patent No.: US 8,924,858 B2
(45) Date of Patent: Dec. 30, 2014

(54) TOUCH-BASED SYSTEM FOR TRANSFERRING DATA

(75) Inventors: Pranav Kirtikumar Mistry, Cambridge, MA (US); Suranga Chandima Nanayakkara, Cambridge, MA (US); Patricia Emilia Maes, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 207 days.

(21) Appl. No.: 13/282,519

(22) Filed: Oct. 27, 2011

(65) Prior Publication Data

US 2012/0110470 A1 May 3, 2012

Related U.S. Application Data

(60) Provisional application No. 61/408,728, filed on Nov. 1, 2010.

(51) Int. Cl.
*G06F 3/048* (2013.01)
*G06F 3/0488* (2013.01)
*G06F 3/0486* (2013.01)

(52) U.S. Cl.
CPC ............ *G06F 3/0488* (2013.01); *G06F 3/0486* (2013.01); *H04M 2250/22* (2013.01); *H04M 2250/64* (2013.01)
USPC .......................................... 715/748; 715/769

(58) Field of Classification Search
USPC ................... 715/748; 709/213, 214; 719/319
See application file for complete search history.

(56) References Cited

U.S. PATENT DOCUMENTS

| | | | | |
|---|---|---|---|---|
| 6,470,341 | B1* | 10/2002 | Rekimoto | 715/764 |
| 8,077,157 | B2* | 12/2011 | Sengupta et al. | 345/173 |
| 8,332,771 | B2* | 12/2012 | Inaba | 715/769 |
| 8,713,449 | B2* | 4/2014 | Avadhanam | 715/748 |
| 2007/0146347 | A1* | 6/2007 | Rosenberg | 345/173 |
| 2009/0006976 | A1* | 1/2009 | Im | 715/738 |
| 2009/0247080 | A1* | 10/2009 | Falck | 455/41.2 |
| 2010/0138743 | A1* | 6/2010 | Chou | 715/769 |
| 2010/0257251 | A1* | 10/2010 | Mooring et al. | 709/216 |
| 2011/0083111 | A1* | 4/2011 | Forutanpour et al. | 715/863 |
| 2012/0096368 | A1* | 4/2012 | McDowell | 715/748 |
| 2012/0254746 | A1* | 10/2012 | Avadhanam | 715/702 |
| 2012/0324368 | A1* | 12/2012 | Putz et al. | 715/748 |

OTHER PUBLICATIONS

Andy Ihnatko, "iPhone® Fully Loaded," Dec. 9, 2009, John Wiley & Sons, Third Edition, pp. 213-215.*

(Continued)

*Primary Examiner* — Dino Kujundzic
(74) *Attorney, Agent, or Firm* — Sam Pasternack; MIT Technology Licensing Office

(57) ABSTRACT

Data transfer system. The system transfers data by touch from a first digital device to a second digital device and includes a first digital device having a touch screen along with a second digital device also having a touch screen. The first and second digital devices are connected to a network including a data storage cloud wherein the first digital device is programmed to copy a touched visual representation of a data item to the data storage cloud and wherein the second digital device is programmed to retrieve the data item from the data storage cloud when a paste-able area in the second digital device is touched. The first and second digital devices may be touch-enabled smart phones, tablet computers or other digital devices.

9 Claims, 10 Drawing Sheets

(56) References Cited

OTHER PUBLICATIONS

Marting Trautschold et al., "Droids Made Simple: for the Droid, Droid X, Droid 2, and Droid 2 Global," Dec. 27, 2010, Apress, pp. 449-456.*

Box.net. http://www.box.net.

Dropbox.http://www.dropbox.com.

Nacenta, M.A., Aliakseyeu, D., Subramanian, S. and Gutwin, C. A comparison of techniques for multi-display reaching. Proc. CHI, 2005, 371-380.

Rekimoto, J. Pick-and-drop: a direct manipulation technique for multiple computer environments. Proc. UIST, 1997, 31-39.

Wobbrock, J. O., Wilson, A., and Li, Y. Gestures without Libraries, Toolkits or Training: A $1 Recognizer for User Interface Prototypes. Proc. UIST 2007, 159-168.

Zigelbaum, J., Kumpf, A., Vazquez, A. and Ishii, H. SLURP: Tangibility, Spatiality, and an Eyedropper. Proc. CHI, 2008, 2565-2574.

Ikeda, Y., Kimura, A. and Sato, K. Tool Device: Handy Haptic Feedback Devices Imitating Every Day Tools, HCI international, 2003, 661-665.

* cited by examiner

TOUCH-BASED SYSTEM FOR TRANSFERRING DATA

This application claims priority to provisional application Ser. No. 61/408,728 filed on Nov. 1, 2010, the contents of which are incorporated herein by reference.

BACKGROUND OF THE INVENTION

This invention relates to data transfer, and more particularly to a system that enables the transfer of data from one digital device to another digital device by touch.

The problem of moving digital media between common digital devices such as notebook computers, PDAs, smartphones, tablets, digital white boards and others has been well studied [Nacenta, M. A., Aliakseyeu, D., Subramanian, S. and Gutwin, C. A comparison of techniques for multi-display reaching. *Proc. CHI,* 2005, 371-380.]. USB drives, external hard disks or online data servers such as Dropbox [http://www.dropbox.com/] and Box.net [http://www.box.net] are some of the common ways to move files or media from one device to the other. Other means such as Email, Bluetooth are also used to transfer or share digital data. In addition, there have been attempts to make the transfer of digital media more tangible and interactive [Rekimoto, J. Pick-and-drop: a direct manipulation technique for multiple computer environments. *Proc. UIST,* 1997, 31-39.; Zigelbaum, J., Kumpf, A., Vazquez, A. and Ishii, H. Slurp: Tangibility, Spatiality, and an Eyedropper. *Proc. CHI,* 2008, 2565-2574].

It is an objective of the present invention to transfer data between digital devices by touch alone. The user can transfer data from one digital device to another by conceptually copying it in their body from the first device and pasting/passing back to the second device. The actual transfer of data occurs using the Internet, intranet network or any other type of data servers that the devices are connected to. In order to differentiate one user from another any of the authentication methods such as username/password, drawing a pattern on the touch screen, face recognition or fingerprint detection can be used.

SUMMARY OF THE INVENTION

In exemplary implementations of this invention, data is transferred between digital devices in a fun and intuitive way. The user touches whatever data item he or she wants to copy from a device. Next, the user touches the other device he or she wants to paste/pass the saved content into. Touch-based interactions are used as indications for what to copy and where to pass it. Technically, the actual transfer of data happens via the information cloud. From a user perspective, however, it seems as if the data item is saved in the user's body (when the user touches the first device) and is then transferred from the user's body to the second device (when the user touches the second device).

The system according to the invention for transferring data by touch from a first digital device to a second digital device includes a first digital device having a touch screen and a second device also having a touch screen. The first and second digital devices are connected to a network including a data storage cloud. The first digital device is programmed to copy a touched visual representation of a data item to the data storage cloud and the second digital device is programmed to retrieve the data item from the data storage cloud when a paste-able area in the second digital device is touched. In a preferred embodiment, the first and second digital devices may be touch enabled smart phones, tablet computers or other digital devices. The network may be the Internet or an intranet. In preferred embodiments the data may be text, still photographs, videos or link to digital data item on the Internet.

DESCRIPTION OF THE PREFERRED EMBODIMENT

Our digital devices are now increasingly relying upon the cloud, the cloud of information. In addition, touch is becoming a more common way to interact with these devices. The present invention lets a user conceptually transfer data from one digital device to the user's body and pass it to another digital device by simple touch gestures. Technically, the actual transfer of data happens on the cloud. The invention is referred to by the inventors as SPARSH which is a Hindi word for touch and is motivated by rituals in Hinduism involving touch such as creating a colored mark on forehead (known as Tilak) by touching the forehead with a colored power.

Figure 1:
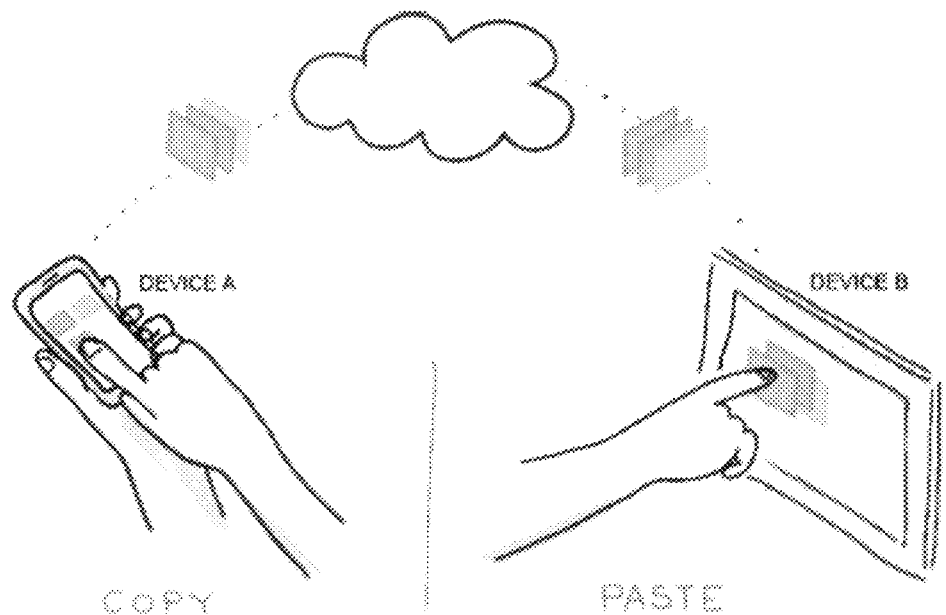
FIG. 1(A) is a schematic illustration showing data being copied from device A and pasted onto device B.
FIG. 1(B) is a schematic illustration showing both actual and conceptual data transfer according to an embodiment of the invention.
Figure 1:
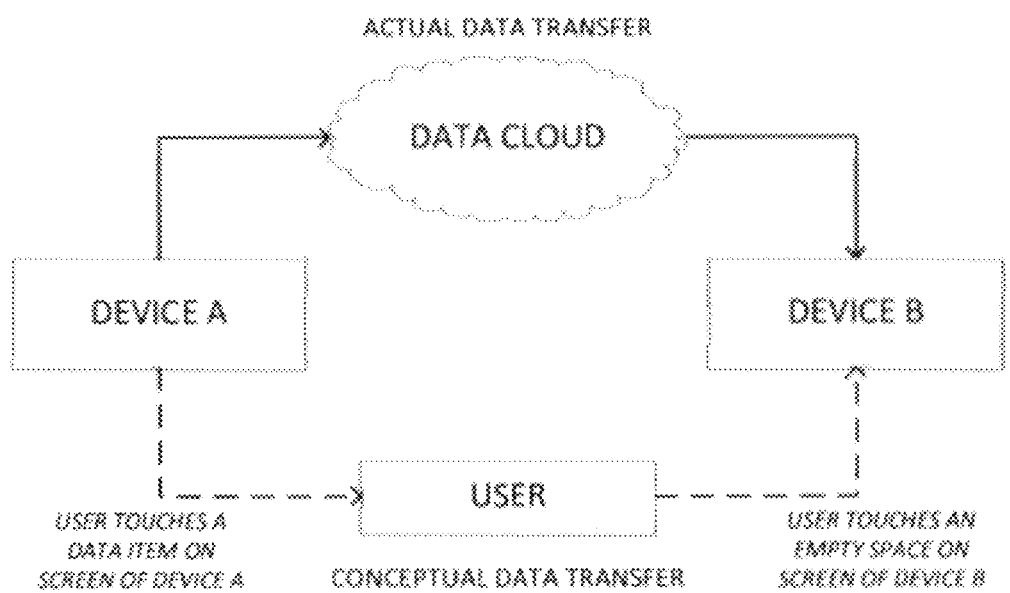

FIG. 1(A) and FIG. 1(B) illustrates user interaction and data transfer, in an illustrative implementation of this invention. Device A and device B are connected to a data cloud. Device A and device B can be a touch-enabled smartphone, tablet computer or a similar digital device. Data cloud can be the Internet or a private data cloud (or Intranet). A user may select a data item by touching it on a screen. In response to this selection, the selected data item (or a reference to the data item) is stored in the assigned storage of the user on the cloud. Then the user can, by touching the screen of device B, indicate that the stored data item be passed/copied to device B. In response to this user interaction, the data item is retrieved from the cloud to device B. Thus, the actual data transfer happens via the cloud, while the user interaction provides the indication to what to copy, from where and where to pass it. Device A and device B need not be on the same location. Thus, from a user perspective, it seems is as if the data item is saved in the user's body (when the user touches device A) and is then transferred from the user's body to device B (when the user touches device B). This user experience is referred as "conceptual data transfer".

Figure 2:
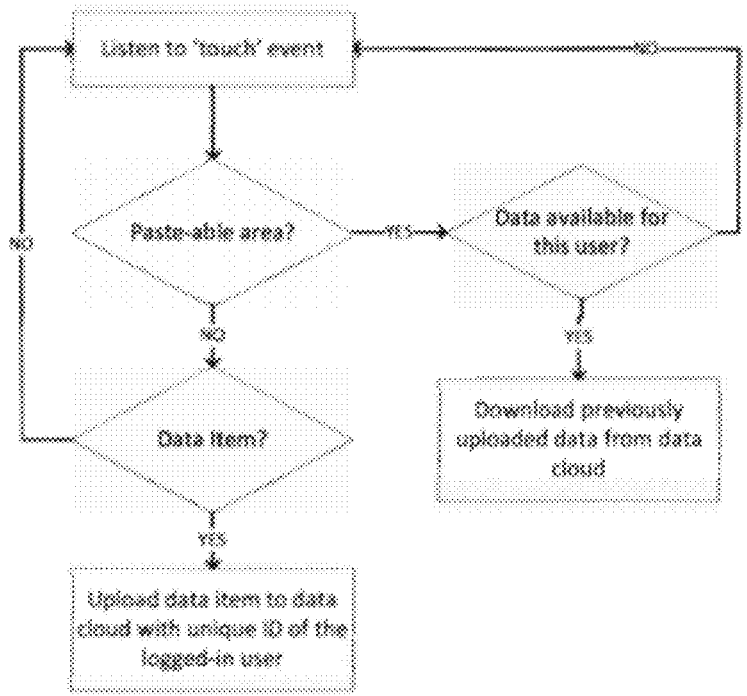
FIG. 2 is a flow chart showing high-level functionality of the invention disclosed herein.

FIG. 2 is a flow chart to illustrate the high-level functionality of SPARSH. In this exemplary implementation, SPARSH frequently checks whether a user is touching the touch screen of a device (touch-enabled smartphone, tablet computer or a similar digital device). If touch is detected in an area that is not a paste-able area, and if the item selected is a data item, then SPARSH copies the data into a data cloud with a unique ID of the currently logged-in user. (The data cloud can be the Internet, a private data cloud or an intranet). On the other hand, if the user touches a paste-able area of the screen (such as the address bar of a webpage, empty space of a folder), SPARSH checks whether compatible data previously copied by the same user is available on the data cloud. For example, if the user touches a search bar of a map application, SPARSH checks whether there is previously copied location information available on the data cloud with the same user ID. SPARSH downloads the data from the data cloud, if the data is available.

In SPARSH, when a user touches some text data or other visual representation of a data, it is recorded as "copy". The user next touches another one of their devices, which triggers a "paste" of the data that was just previously copied. The actual data could either have been stored in the cloud already, so that it can now be retrieved to the second device from the cloud. Alternatively, when the "paste" act happens, the item could be copied from the original device to the destination device directly. The SPARSH system requires that the devices have touch screens and that they are networked so that they can communicate copy and paste events. In order to differentiate the user's other intentions of touching a data item, such as touching an image item in photo gallery to view it larger, SPARSH uses the long-press (touching the data item for more than a predefined time (e.g. 1.5 seconds).

Scenario 1: Transferring an Address Received in an SMS from a Mobile Phone to Google Maps on a Computer.

Figure 3:
FIG. 3 is a perspective view of an embodiment of the invention in which an address is transferred from a SMS message received on a mobile device to a Google maps on a tablet computer.

Imagine you received a text message on your mobile phone from a friend with the address you are meeting him at. You touch the address and it gets conceptually copied in you. Now you paste that address to the search bar of Google Maps in a web browser of your computer by simply touching that [FIG. 3].

Scenario 2: Transferring a Phone Number/Text from Web-Page to a Mobile Phone.

Figure 4:
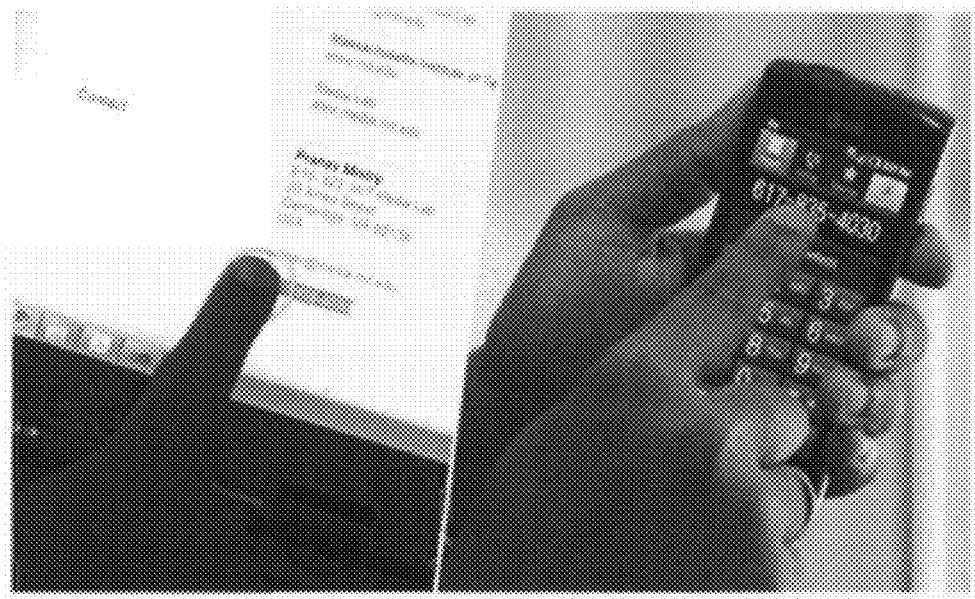
FIG. 4 is a perspective illustration showing the copying of a phone number from a webpage on a tablet computer to a mobile phone.

Imagine you want to contact a person whose contact information was found while browsing a website on your computer. You copy the phone number on the screen by touching it; now rather than manually typing that phone number, you can simply paste it to your mobile phone dial pad by touching [FIG. 4].

Scenario 3: Sharing Pictures

Figure 5:
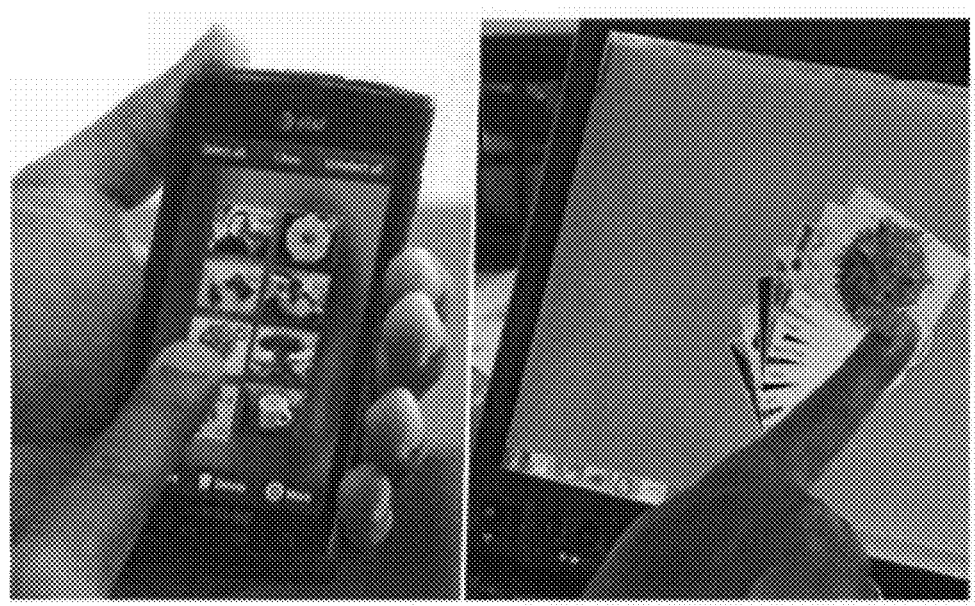
FIG. 5 is a perspective illustration showing the copying of pictures from a phone to a tablet computer.

Imagine you want to share some pictures that you took using your camera to your friend's tablet computer. Select the pictures you want to copy from the camera by touching them and then paste them to the tablet computer by touching the screen of the tablet [FIG. 5].

Scenario 4: Moving Online Videos Between Devices

Figure 6:
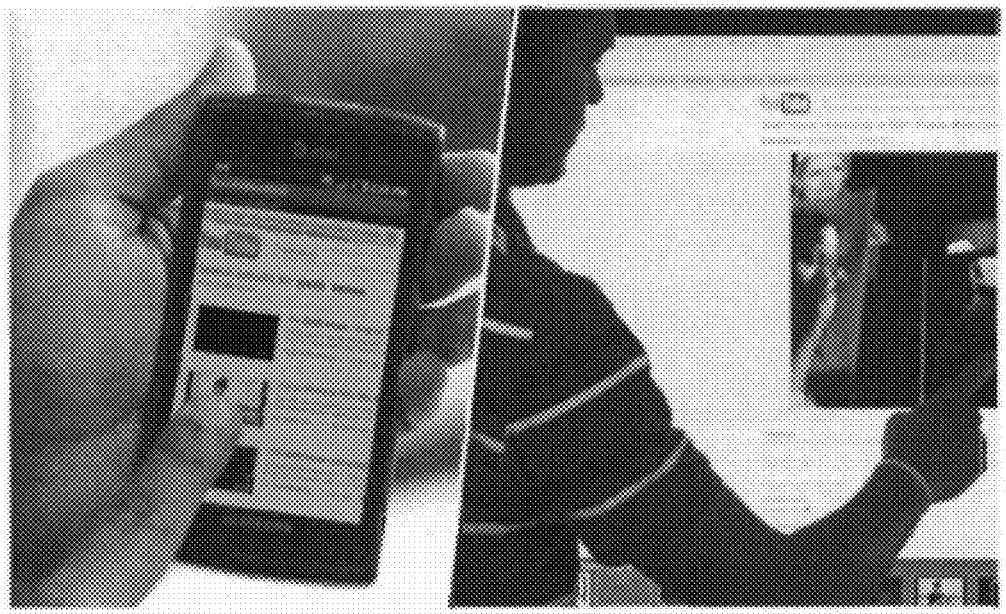
FIG. 6 is perspective view showing the moving of a video link from a mobile YouTube browser to a larger digital display.

You see a video link posted on YouTube on your mobile phone. But you do not want to watch the video on the small mobile phone screen. Simply touch the link, paste it to a larger screen by touching it and enjoy the video [FIG. 6].

Figure 7:
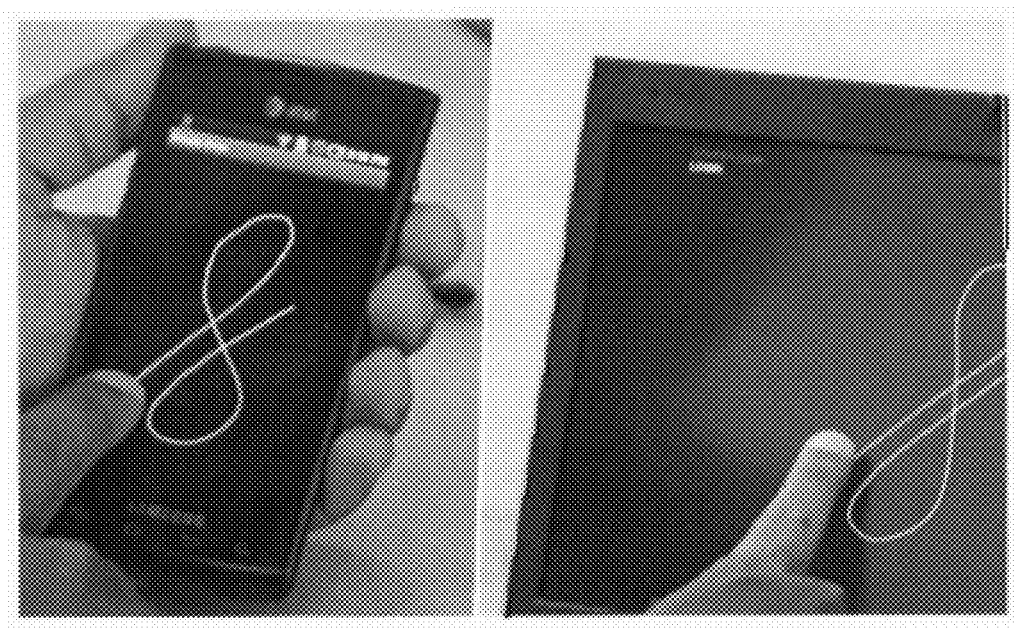
FIG. 7 is a perspective view illustrating the identification of a user by drawing a unique pattern on the screen.

In the scenarios discussed above, SPARSH proposes a novel way of data transfer between personal digital devices belonging to a single user. However, in the case where a device is shared by multiple users or a user wants to pass data from his personal device to another user's personal device, the question of user identity arises. SPARSH uses an authentication method such as sign in using username/password, drawing a pattern on the screen, face recognition or fingerprint detection in order to differentiate one user's touches to another user's touches. As example, the exemplary implementation uses a "gesture signature", a user-defined unique pattern drawn on the screen, to distinguish one user's copy-and-pastes from another user's copy-and-paste act (as shown in FIG. 7).

Overview of the SPARSH System

A. Enabling SPARSH

The exemplary SPARSH system disclosed herein runs as a background service on a digital device. A user has the option to enable this service through the system's main settings [FIG. 8]. In a SPARSH enabled mode, an icon appears on the status bar of the screen showing the status (if a user has signed in). A user can touch this icon to login or change users [FIG. 9]. After a user has signed in, SPARSH listens to a long-press touch events (if the user touches the screen for more than a pre-specified duration) and initiates copying/pasting of data. User Authentication, Copying and Pasting activities are explained in the following section.

B. User Authentication

Figure 10:
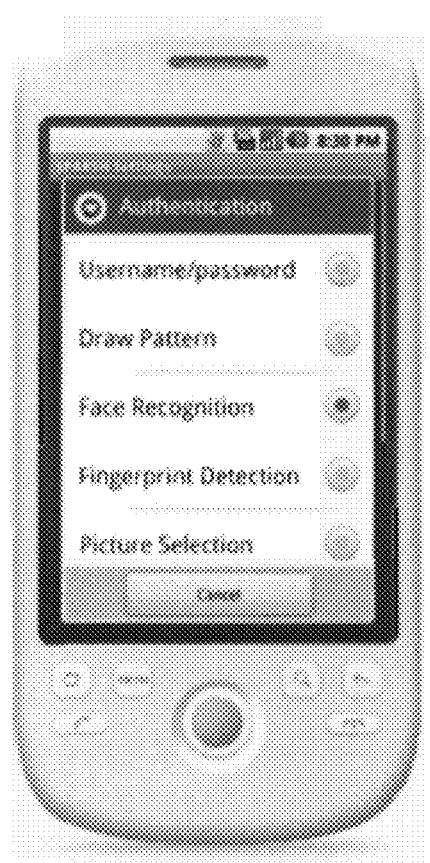
FIG. 10 is a schematic illustration of ways to login to the system.

A user needs to login (to be authenticated) to the SPARSH system before he/she is allowed to copy-paste data. There are a few ways of doing this. Examples include but are not limited to: [FIG. 10]

(1) Using an interface with text boxes to enter username and password (2) Drawing a secret sign or pattern on the touch screen device (3) Face recognition (for devices with a camera)

(4) Fingerprint detection (for devices with a fingerprint reader)

Figure 8:
FIG. 8 is a schematic illustration of a system settings panel used for user authentication and setting user preferences.
Figure 9:
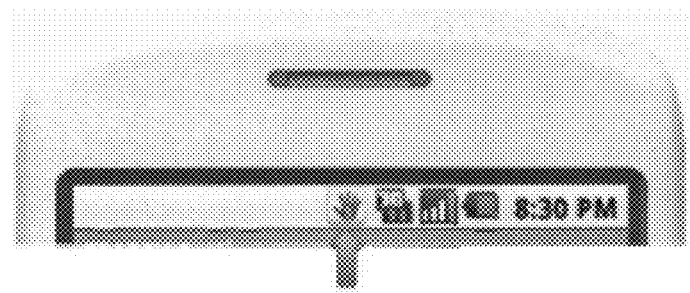
FIG. 9 is an illustration of an icon shown on the computer/mobile phone status bar in an embodiment of the invention.

User can select the preferred authentication method on the system settings panel [FIG. 8]

C. Copy Data

Figure 11:
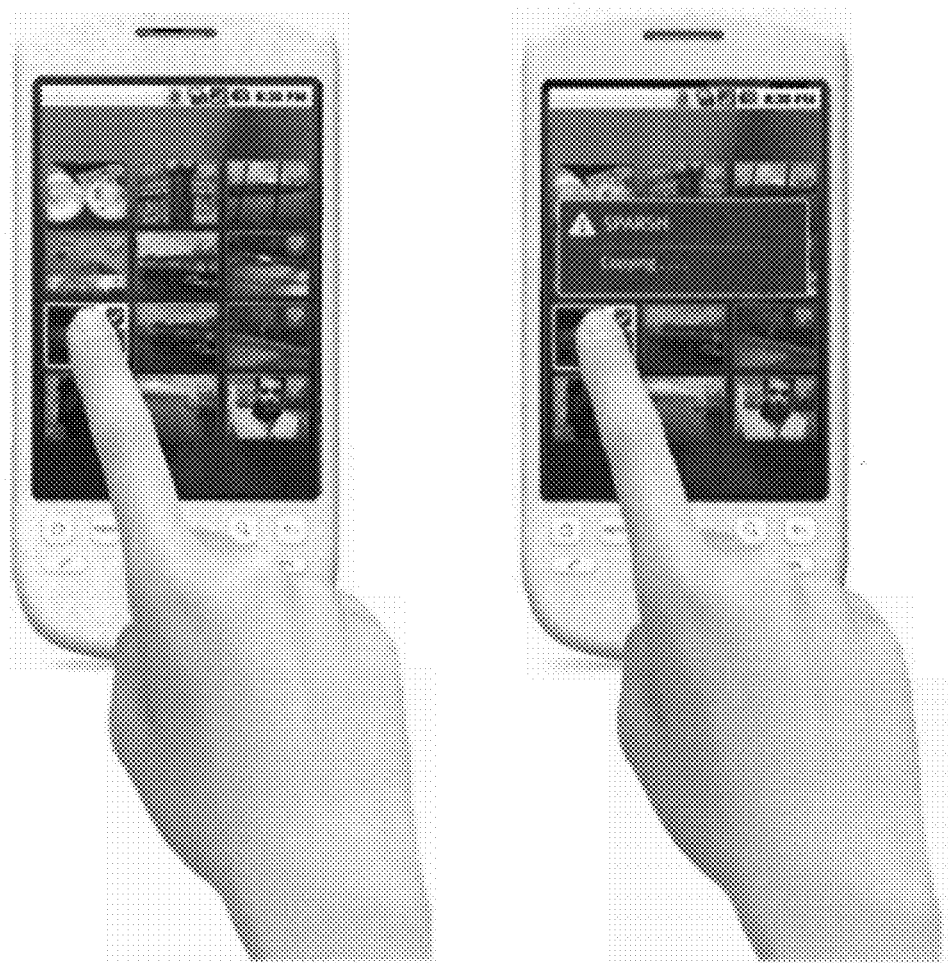
FIG. 11(A) and (B) are schematic illustrations of a screen showing completion of a copying operation for a photograph and a video respectively.
Figure 11:
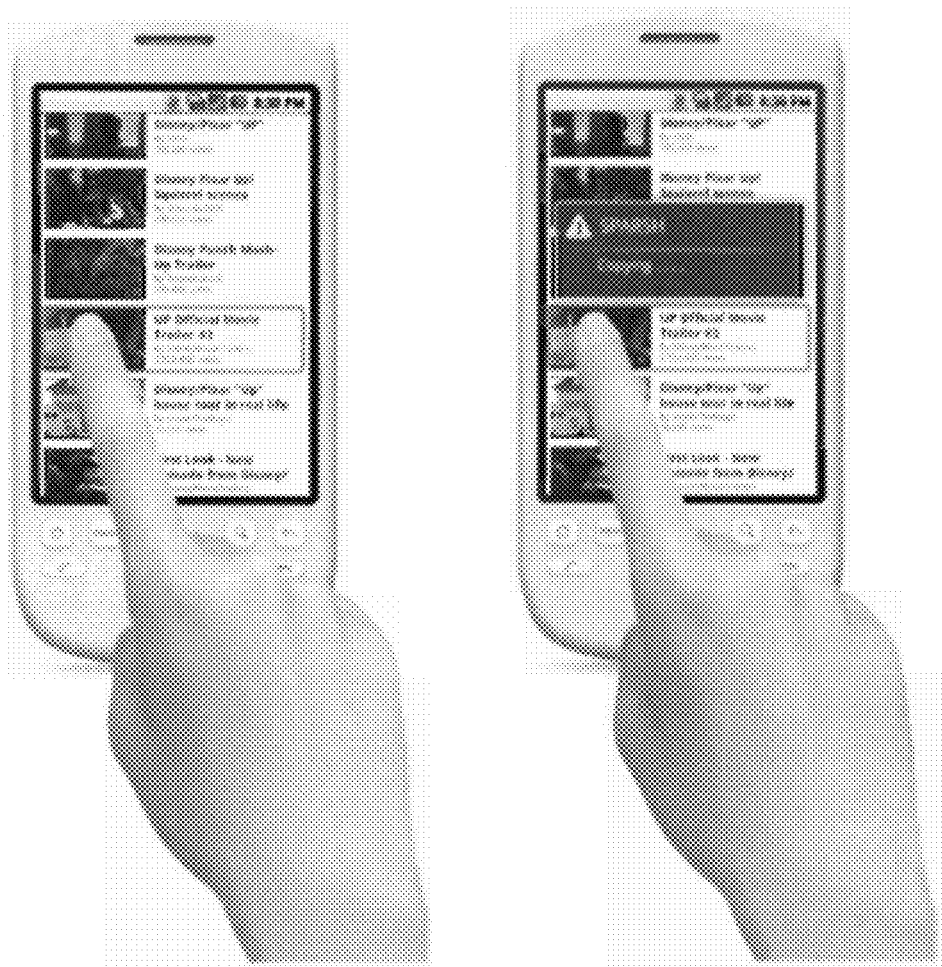

Identifying a 'Copy' Event:

SPARSH uses a long-press' on a data item (keeping finger on a data item for more than 1.5 seconds) as an indication of user's intention to copy that data item. A touch-listener method starts counting the time elapsed when a user touches a data item (image, text, etc.). When time exceeds the threshold (1.5 seconds), a message appears indicating that the data item is being copied and gets copied to the user's unique space in the data cloud. User can take the finger away as soon as the 'copying' message appears and move on to copy the next item, if any [FIG. 11(A) and FIG. 11(B)].

Figure 12:
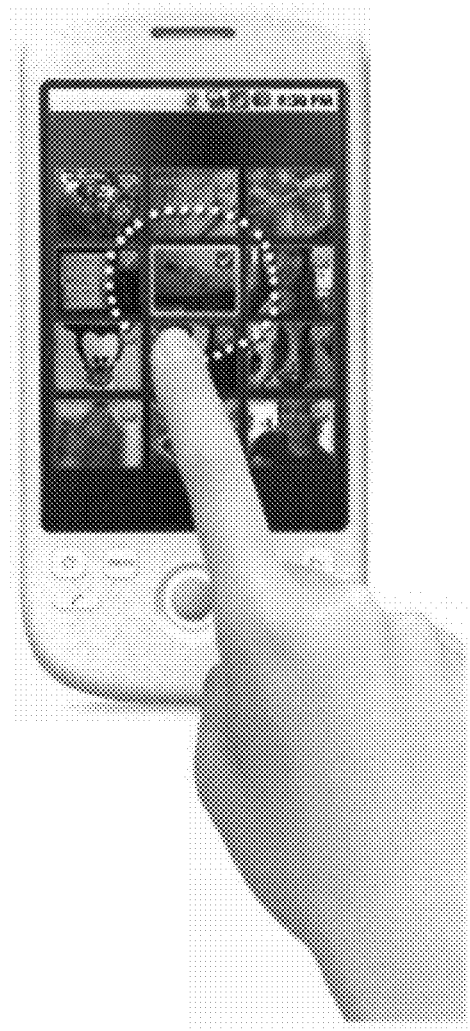
FIG. 12 is a schematic illustration of an embodiment of the invention that allows a user to initiate copying action by drawing a circle around a data item.

It is possible to have alternative ways to initiate the data copying action (instead of long-press for 1.5 seconds). For example, (1) a user can draw a circle around the data item to indicate the intention of copying that data item [FIG. 12]. Or (2) double tap on a data item to initiate the copying process.

Copying Multiple Items:

Users can copy more than one item by 'touch-copying' them in a sequential manner. All the data items get transferred to user's space in the data cloud with a unique ID.

Handling Different Data Types:

Data on the cloud is saved into the user's space (folder with a unique ID) in a specific name format: TIMESTAMP_ NAME.TYPE where TIMESTAMP is a unique string generated from the server time, NAME is file name, TYPE is the data type (JPEG, PNG, TXT, etc.)

When Copying a whole file (word documents, image etc.) the system uses the local file name as NAME and TYPE is same type as the original file.

When copying a portion from a source (URL link, SMS text, Phone Number on a website), the system copies the content into a text file (i.e. TYPE=txt). Set the NAME as (TEMP_URL, TEMP_SMS, TEMP_PHONE etc.)

D. Paste/Pass Data

Identifying a 'Paste' Event:

Similar to copy event, SPARSH uses a long-press' to identify a paste attempt. However, the main difference is that the user needs to long-press an empty space on the touch screen. SPARSH identifies long-press on a data item as an indication to copy and long-press on empty space as an indication to paste.

Figure 13:
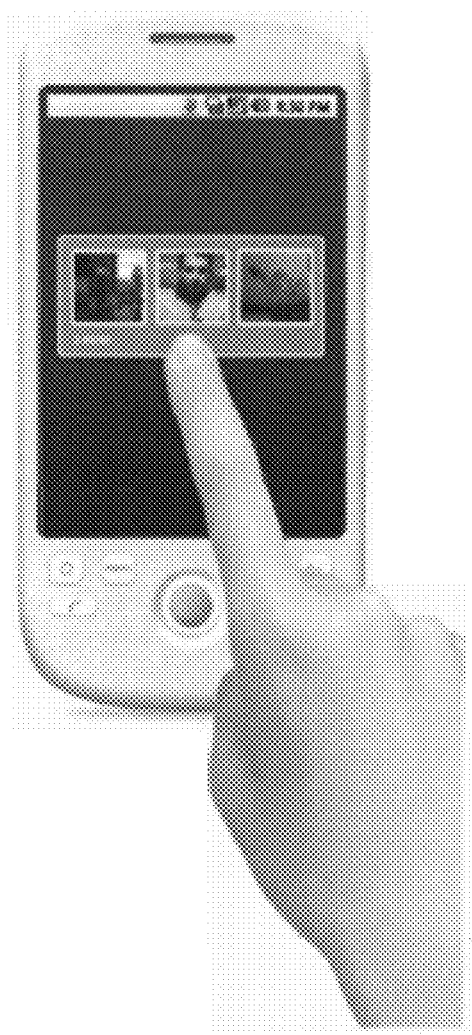
FIG. 13 is a schematic illustration showing a preview of data available for pasting.

Pasting:

Once the pasting action is established, SPARSH looks for contents in the cloud space assigned (folder with a unique ID) to a specific user. A small preview of the available data is shown to the user. User can touch one item on the preview to paste that item or multiple items to paste multiple items [FIG. 13]. Data is automatically removed from the server after pasting but a user has the option to change the SPARSH settings to keep a copy in the cloud.

Handling Different Data Types:

When pasting data, SPARSH pays special attention to the type of data and selects appropriate action. For example, images are saved into an Images folder; URLs open up on the default web browser on the device etc.

First SPARSH looks at the 'TYPE' extension of the filename. If it is not '.txt' SPARSH saves the data item on the location where pasting was initiated (i.e. If a user touched a desktop, the file is saved onto the desktop). If the file has a TYPE is 'txt', SPARSH looks at the NAME field in the name format to identify whether it is a URL, PHONE etc. and open the file content using an appropriate application.

The pasting process is illustrated in the following pseudo code:

```
=======================
Listen for a Long Press
    IF long Press and NOT on a data item
        Initiate Paste ( )
        Go back to Listen
Initiate Paste ( )
Check User's Folder in the cloud server
IF Contents Available
    Preview Contents
    IF Select Preview Item
        Check FileName (FileName = TIMESTAMP_NAME.TYPE)
        Check TYPE
            IF not '.txt'
                Download file to current location
            ELSE
                Check NAME
                Open File contents using an appropriate application
=======================
```

E. Other Methods of Accessing SPARSH Data

Users can access the data on their data cloud without SPARSH Mode. They can access their data cloud through a web interface. This enables users to retrieve data even on a non-touch screen device. It is also possible to provide software application (to install on to a computer/mobile phone) enabling direct drag-and-drop access to user's data cloud.

Implementation

The current SPARSH system is set up on two mobile phones running Android 2.1, a tablet PC running Windows 7 and a 36-inch touch screen display. In exemplary implementations, SPARSH uses Dropbox [http://www.dropbox.com/] to store the data in a temporary folder. The user runs SPARSH software program on their devices, and signs-in using their Dropbox credentials. Typically, a user stays "signed in". Other users can temporally sign-in using their Dropbox credentials. Once signed in, the user has to perform only two acts, a copy and a paste to transfer data between devices. In SPARSH mode, if a user touches a data item (such as a picture, video link and text), it gets uploaded to the user's SPARSH folder on Dropbox. If the user touches a paste-able area on the screen (such as a search bar or blank space in a folder), the corresponding data is retrieved from the user's Dropbox.

In another implementation of the SPARSH system (an alternative to the Dropbox 250 approach) the data cloud runs on an FTP server, where each user has a folder with a unique ID. In yet another implementation the user is authenticated using a unique drawn pattern on the touch screen. This is implemented using a "$1 recognizer" [Wobbrock, J. O., Wilson. A., and Li, Y. Gestures without Libraries, Toolkits or Training: A $1 Recognizer for User Interface Prototypes, UIST 2007, 159-168].

Typically, a user stays "signed in" on their own devices, unless someone else signs in. Thus, normally, a user has to perform only two acts, a copy and a paste to transfer data between their own personal devices. In SPARSH mode, if a user touches a data item on screen (a picture, video link, text, etc) it gets uploaded to his folder on data cloud (Dropbox or FTP server). If the user touches a paste-able area on screen, SPARSH retrieves corresponding data from his folder on the data cloud.

Users can copy multiple items by touching them in sequence and when pasting, the use can touch-select the data item to be copied for a preview.

It is possible that users might touch data and empty spaces on touchscreen devices for a variety of other reasons. The current SPARSH implementation uses a long-press to differentiate SPARSH-ing from other touch-based interactions.

Although interaction supported by SPARSH are best suited for touchscreen devices, Dropbox based implementation allows users to access data from their Dropbox application installed on regular non-touchscreen devices or through Dropbox's web interface as well. It is straightforward to extend SPARSH implantation to other data cloud services such as Box.net.

SPARSH thus introduces a novel interaction method to seamlessly transfer data between digital devices in a fun and intuitive way. Users can conceptually copy data onto their body from one device and pass it to another using natural touch interactions. This document outlined a number of interesting interaction scenarios emerged with SPARSH and there are many to be discovered.

It is recognized that modifications and variations of the invention will be apparent to those of ordinary skill in the art and it is intended that all such modifications and variations be included within the scope of the appended claims.

The contents of all of the references cited herein are incorporated into this application by reference in their entirety.

REFERENCES

1. Box.net. http://www.box.net
2. Dropbox. http://www.dropbox.com
3. Nacenta, M. A., Aliakseyeu, D., Subramanian, S. and Gutwin, C. A comparison of techniques for multi-display reaching. *Proc. CHI,* 2005, 371-380.

4. Rekimoto, J. Pick-and-drop: a direct manipulation technique for multiple computer environments. *Proc. UIST,* 1997, 31-39.
5. Wobbrock, J. O., Wilson, A., and Li, Y. Gestures without Libraries, Toolkits or Training: A $1 Recognizer for User Interface Prototypes. *Proc. UIST* 2007, 159-168.
6. Zigelbaum, J., Kumpf, A., Vazquez, A. and Ishii, H. Slurp: Tangibility, Spatiality, and an Eyedropper. *Proc. CHI,* 2008, 2565-2574.
7. Ikeda, Y., Kimura, A. and Sato, K. TOOL DEVICE: Handy Haptic Feedback Devices Imitating Every Day Tools, *HCI International,* 2003, 661-665.

What is claimed is:

1. System for transferring data by touch by a user's finger from a first digital device to a second digital device comprising:
    a first digital device having a touch screen displaying a first user interface, the first user interface comprising a first paste-able area and a second area that is not paste-able, wherein a paste-able area allows for content to be pasted into such area, and wherein the second area comprises a visual representation of a data item; and
    a second digital device having a touch screen displaying a second user interface comprising a third paste-able area;
    the first and second digital devices connected to a network including a data storage cloud, wherein the first digital device is programmed to copy a touched visual representation of the data item located in the second area to the data storage cloud, and wherein the second digital device is programmed to retrieve the data from the data storage cloud when the third paste-able area is touched, wherein the touch is by the user's finger, wherein the system checks whether compatible data from the second area previously copied by the same user is available on the data storage cloud and then downloads the compatible data from the data cloud to the second device to be displayed in the third paste-able area.

2. The system of claim 1 wherein the first and second digital device are touch-enabled smart phones, tablet computers or other digital devices.

3. The system of claim 1 wherein the network is the internet or an intranet.

4. The system of claim 1 wherein the data is text.

5. The system of claim 1 wherein the data is a still photograph.

6. The system of claim 1 wherein the data is video.

7. The system of claim 1 wherein the data is linked to a data item on the internet.

8. The system of claim 1 further including a user authentication module wherein user authentication is achieved by face recognition, fingerprint detection, picture selection, drawing a pattern on the screen, or username/password.

9. The system of claim 1, wherein copying and pasting operations are controlled by drawing a user selected pattern on the screen.

* * * * *